May 28, 1963 A. S. PATTEN 3,091,272
NUT AND CLIP ASSEMBLY SECURED TOGETHER BY STAKING
Filed June 25, 1958
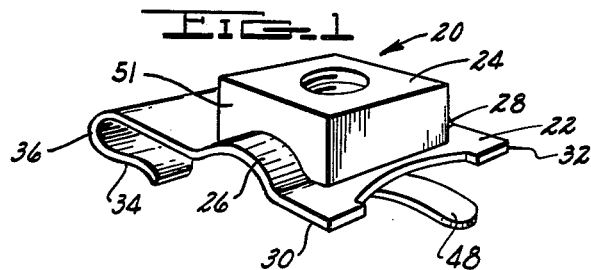
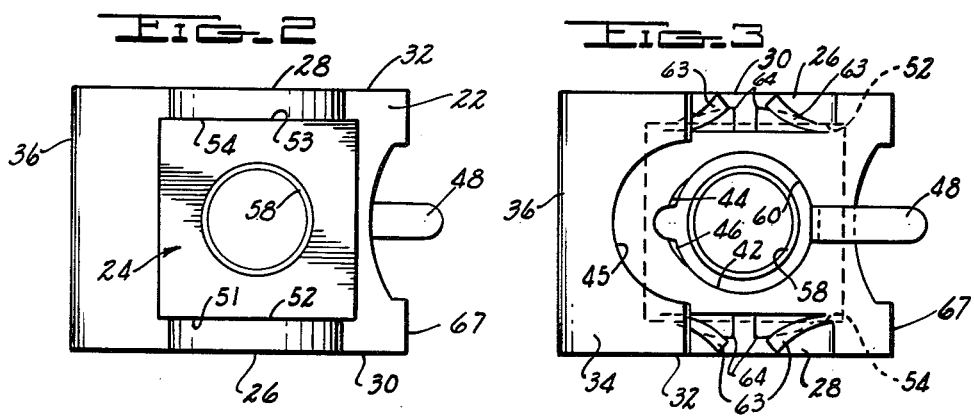
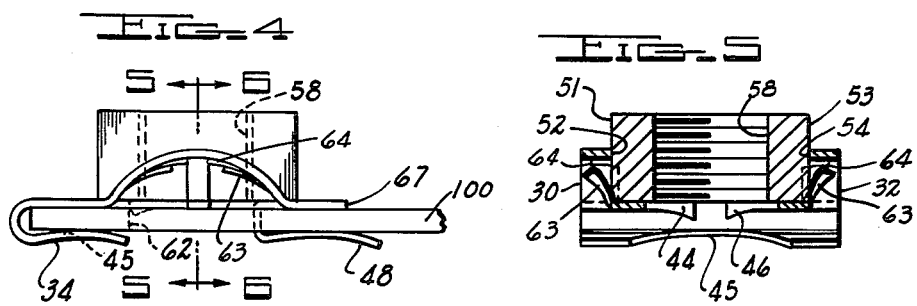
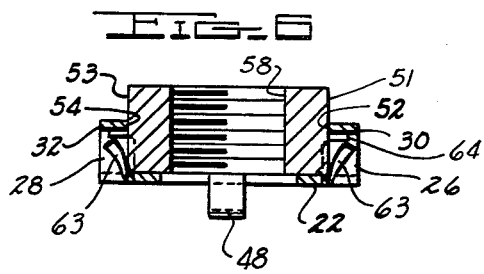
INVENTOR
ALEXANDER S. PATTEN
KOTTS & SHERIDAN
ATTORNEYS

United States Patent Office 3,091,272
Patented May 28, 1963

3,091,272
NUT AND CLIP ASSEMBLY SECURED
TOGETHER BY STAKING
Alexander S. Patten, Birmingham, Mich., assignor to
Multifastener Spring Division, Inc., Bedford, Mich.
Filed June 25, 1958, Ser. No. 744,375
2 Claims. (Cl. 151—41.75)

The present invention relates to new and useful improvements in fasteners and more particularly to a fastener which will function in a more efficient manner while being less expensive to manufacture.

The instant application is a continuation-in-part of my prior application Serial No. 678,500.

An object of this invention is the provision of a fastener which is simple and durable in construction and capable of being manufactured in large quantities by modern mass production methods.

Another object of the present invention is the provision of a unitary fastener that will provide a washer action between the parts on which it is affixed.

Still another object of this invention is the provision of a fastener which is mounted on a panel member and positioned by finger members which are integral with said fastener.

Another object of the present invention is the provision of an efficient fastener which will have an economic advantage because it requires a minimum amount of labor and material to manufacture.

Still another object of the present invention is the provision of a multiple thread fastener which is made from a standard square nut mounted on a flat soft strip of thin material.

The foregoing and related objects can be accomplished by the provision of a fastener having a thin flat elongated strip of soft material which forms a washer and nut carrying body portion; an opening in said thin flat elongated body portion; a finger struck from the central area of the body portion formed to underlie in spaced relationship the forward portion of the fastener; a leg, integral with the body, formed to underlie the rear portion of the fastener; an area cut away from two edges of said body portion which is arcuately embossed and perpendicular to the flat body portion; the two inner parallel faces of said arcuate embossures spaced to engage two parallel faces of the standard commercial nut; a portion struck from the body portion and the parallel faces of said commercial nut to engage the underside of said arcuate embossures to position said commercial nut on said elongated body portion.

Other objects of this invention will appear in the following description and appended claims, reference being had to the accompanying drawings forming a part of this specification wherein like reference characters designate corresponding parts in the several views.

In the drawings:

FIG. 1 is a perspective view of a fastener assembly embodying the present invention.

FIG. 2 is a top plan view of FIG. 1.

FIG. 3 is a bottom plan view of FIG. 2.

FIG. 4 is a side elevational view of the fastener illustrated in FIG. 1.

FIG. 5 is a cross-sectional view taken along line 5—5 of FIG. 4.

FIG. 6 is a cross-sectional view taken along the line 6—6 of FIG. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIG. 1 represents a perspective view of a fastener assembly 20 embodying the present invention. The fastener assembly comprises two parts, namely, a generally flat body portion 22 and a standard commercial square nut 24 positioned on said body portion.

The body portion 22 is of generally flat construction and made from a thin, narrow strip of soft, low carbon steel, as opposed to spring steel which is currently used. Two arcuately shaped embossures 26 and 28 are formed in the central area of the sides of the body portion 22. One end of the body portion 22 has formed thereon a leg member 34 which extends beneath the body portion. The leg member 34 is integrally connected to the body portion 22 by a radial wall 36. A finger member 48 is struck downwardly from the central area of the body portion 22 and is formed to underlie and extend beyond the forward portion of the fastener proper. The flat body portion 22 of the fastener assembly 20 is somewhat longer than the lower leg 34 and forms a double J type construction. The forward edge of leg member 34 terminates below two downwardly formed locating tab members 44 and 46 which are struck from the edge 60 of an opening 42 located in the body 22. The central portion of leg 34 has an arcuate portion 45 cut therefrom to provide bolt clearance.

The arcuate embossures 26 and 28 are struck from the edges 30 and 32 of the body and are of equal width and parallel to each other. The inner edges 52 and 54 of the arcuate embossures 26 and 28 are so spaced as to provide a means for longitudinally locating a standard commercial square nut 24 therebetween. The threaded portion 58 of the standard nut 24 overlies the opening 42 in the body portion 22. When the standard nut 24 and opening 42 are properly aligned, the standard commercial nut 24 is effectively locked in position by a staking operation.

Since the arcuate embossures 26 and 28 are of equal width and parallel to each other and so spaced as to receive a standard commercial nut 24 therebetween, it is apparent that the inner edges 52 and 54 of the body portion 22 will engage the corresponding opposed perpendicular edges 51 and 53 of the nut 24, to prevent rotation of the nut with respect to the body.

The positioning and locking of the standard commercial nut 24 on the body portion 22 is accomplished by cutting away and deforming a portion of the body 22 and nut 24. In so doing the cut away portions are deformed to underlie the radial embossures as shown at 64 in FIG. 3 of the drawings. The cut away portion 63 of the body 22 and cut away portion 64 of the standard nut 24 remains integral with their respective parts after deformation. The leg member 34 as shown in FIG. 3 terminates on a line rearward of opening 42 in the body portion 22. Leg member 34 has a central arcuate portion 45 cut therefrom to provide ample bolt clearance when said fastener is installed on a panel member. The finger member 48 which is integral with the body 22 acts as a finder for the mounting opening 62 in a panel member. Finger member 48 terminates forward of the edge 67 on the body portion 22. The inner edge of the finger 48 and the tabs 44 and 46 center the fastener assembly 20 in the mounting opening 62 of a panel member 100 (FIG. 4).

FIG. 2 is a top plan view of the fastener embodying the present invention illustrating the simplicity of the two part fastener. The standard nut 24 is positioned on the body portion 22 between the arcuate embossures 26 and 28.

FIGS. 5 and 6 illustrate views taken along lines 5—5 and 6—6 of FIG. 4 to illustrate the centering action of tabs 44 and 46 which cooperate with finger member 48. The cut away portions 64 in the standard commercial nut 24 are deformed to underlie the arcuate embossures 26 and 28 to positively position and anchor the nut 24 in proper position.

From the foregoing description it will be apparent to one skilled in the art, that a washer action is provided between the nut and panel member, that the present invention requires a minimum of material and is therefore less expensive than other fasteners, that said fastener is efficient, simple and durable, while being capable of being produced in large volume by modern mass production methods.

Having thus described my invention, I claim:

1. In a clip nut assembly having a polygonal nut having opposing parallel side surfaces and a sheet metal clip to which the nut is secured, the clip including a pair of substantially planar legs joined by a bight portion, said legs having lateral edges extending generally at right angles to the bight portion and the legs being generally parallel to receive therebetween a panel upon which the nut assembly is to be positioned, the nut being superimposed on one of the clip legs in flatwise contact therewith, the nut and the one leg having registering apertures, said one leg underlying and abutting substantially the entire adjacent nut surface, and the parallel side surfaces of the nut being adjacent and substantially parallel, respectively, to the corresponding lateral edges of the one clip leg, the combination therewith of a pair of parallel linear slots in the one clip leg substantially vertically aligned with the nut side surfaces and of less length than the nut side surfaces, each of said slots defining, respectively, with the adjacent parallel clip leg lateral edge a rectangular portion joined only at fore-and-aft bend lines to the remainder of the one clip leg, said rectangular portions each being arcuately deflected from the one clip leg toward the nut so that the edge of each of the rectangular portions defined by the slot snugly abuts the adjacent nut side surfaces, and each of the nut side surfaces being staked at a plurality of locations lying to either side of the nut center into firm engagement with the undersurface of the adjacent deflected portion, respectively, and those portions of the planar clip leg originally abutting the staked portions of the nut side surfaces also being staked upwardly to confine the staked nut surfaces against the undersurface of the displaced clip leg portions, respectively, the staked clip leg portions being joined to the clip leg at the juncture of the displaced leg portion and the remainder of the clip leg so that the nut is retained against torque displacement by the rectangular portions and is retained against displacement from the clip by flatwise nut-to-clip leg contact and by the plurality of staked nut surfaces.

2. In a clip nut of the type wherein a panel-engaging clip has secured thereto a polygonal nut having two parallel sides, means for adhering the nut to one of a pair of substantially planar and parallel clip legs, the one clip leg having free parallel lateral edges which are also parallel to the two sides of the nut superimposed thereon, said one clip leg having substantially all of the rectangular portions thereof intermediate its parallel edges and the two nut sides displaced from the plane of the one leg to lie alongside the nut sides in a smooth arcuate pattern blending adjacent the ends of the nut sides into the remainder of the leg, the arcuate inner edge of each such displaced leg portion continuously abutting the adjacent side surface of the nut, and the arcuate outer edge of each such displaced leg portion being arcuately parallel to the inner edge thereof, respectively, the nut having a portion of each of its side surfaces lying intermediate the one planar clip leg and the undersurface of the displaced leg portion thereof staked at a plurality of locations located to either side of the center of the nut side to snugly abut said undersurface, and those portions of the one planar clip leg located beneath the nut and aligned with the staked portions of the nut side surfaces also being staked to confine the staked nut surfaces against the undersurfaces of the displaced clip leg portions, respectively, the staked clip leg portions being joined to the one clip leg at the juncture of the displaced leg portion and the remainder of the clip leg.

References Cited in the file of this patent
UNITED STATES PATENTS

| | | |
|---|---|---|
| 1,014,684 | Weygand | Jan. 16, 1912 |
| 2,278,790 | Langmaid | Apr. 7, 1942 |
| 2,552,499 | Tinnerman | May 8, 1951 |
| 2,562,001 | Tinnerman | July 24, 1951 |
| 2,631,634 | Tinnerman | Mar. 17, 1953 |
| 2,777,496 | Khan | Jan. 15, 1957 |